(12) United States Patent
Ross et al.

(10) Patent No.: US 10,220,758 B2
(45) Date of Patent: Mar. 5, 2019

(54) HEATED DRILL CUTTINGS TRANSPORT VESSEL

(71) Applicant: RECOVER ENERGY SERVICES INC., Calgary (CA)

(72) Inventors: Stan Ross, Cochrane (CA); Gregory Steger, Calgary (CA)

(73) Assignee: RECOVER ENERGY SERVICES INC., Calgary, Alberta (CA)

(*) Notice: Subject to any disclaimer, the term of this patent is extended or adjusted under 35 U.S.C. 154(b) by 64 days.

(21) Appl. No.: 15/051,209

(22) Filed: Feb. 23, 2016

(65) Prior Publication Data
US 2016/0243972 A1    Aug. 25, 2016

Related U.S. Application Data

(60) Provisional application No. 62/120,546, filed on Feb. 25, 2015.

(51) Int. Cl.
| | | |
|---|---|---|
| *B60P 3/00* | (2006.01) | |
| *B60P 1/28* | (2006.01) | |
| *B60P 1/64* | (2006.01) | |
| *B65G 67/24* | (2006.01) | |

(52) U.S. Cl.
CPC ............ *B60P 1/286* (2013.01); *B60P 1/6454* (2013.01)

(58) Field of Classification Search
CPC .... B60P 1/286; B60P 1/60; B60P 1/28; B60P 1/56; B60P 1/16; B60P 1/283; B60P 1/003; B60P 3/2295; B60H 1/00014; B60H 1/00364; B60H 1/18; B60H 1/2212; B60H 2001/2293; B60H 1/025; B60H 1/06

USPC ....... 298/1 H, 1 R, 17 R, 22 R, 23 TT, 35 R, 298/1 B, 1 C, 10, 37, 8 R; 220/1.5; 414/513, 514, 520, 528, 699, 800, 809; 105/451, 1.2, 414, 418, 422, 258

See application file for complete search history.

(56) References Cited

U.S. PATENT DOCUMENTS

| | | | | |
|---|---|---|---|---|
| 1,712,083 | A * | 5/1929 | Koppers ................... | C10B 1/10 201/12 |
| 3,331,433 | A * | 7/1967 | Hagberg ............ | B60H 1/00014 165/51 |
| 3,449,678 | A * | 6/1969 | Glen ........................ | H01J 25/49 315/3 |
| 3,897,972 | A * | 8/1975 | Logue ................ | B60H 1/00014 296/183.1 |

(Continued)

*Primary Examiner* — D Glenn Dayoan
*Assistant Examiner* — Sunsurraye Westbrook
(74) *Attorney, Agent, or Firm* — Greenblum & Bernstein, P.L.C.

(57) ABSTRACT

A transport vessel and method specifically adapted for safely and efficiently transporting and removing liquid containing unstabilized drill cuttings. Typically drilling waste is stabilized using binding agents like fly-ash, liquids absorbing pellets or sawdust. In many jurisdictions binding agents are required to stabilize the drilling waste prior to transport. A sealed transport vessel is described herein which is specifically sized and positioned over a set of axels so as to provide for safe, non-spilling transport. In addition, the bottom section of the vessel additionally contains one or more heating elements capable of raising the temperature of the drill cuttings at or near the bottom section of the container to a free flowing state for easy removal, even in cold/adverse weather conditions.

28 Claims, 4 Drawing Sheets

(56) References Cited

U.S. PATENT DOCUMENTS

| | | | | |
|---|---|---|---|---|
| 4,304,609 A | * | 12/1981 | Morris | C10G 1/02 |
| | | | | 134/19 |
| 4,476,788 A | * | 10/1984 | Loevinger | B65D 88/744 |
| | | | | 105/358 |
| 4,775,070 A | * | 10/1988 | Williams | B60P 3/24 |
| | | | | 105/358 |
| RE33,131 E | * | 12/1989 | Morrison | B60P 1/16 |
| | | | | 165/41 |
| 7,320,504 B2 | * | 1/2008 | Colling | B60P 1/286 |
| | | | | 298/1 H |
| 8,465,225 B2 | * | 6/2013 | Groulx | E01C 19/08 |
| | | | | 404/95 |
| 2009/0152934 A1 | * | 6/2009 | Devries | B60P 1/283 |
| | | | | 298/1 H |
| 2014/0353308 A1 | | 12/2014 | MacLean et al. | |
| 2015/0001910 A1 | * | 1/2015 | Natarajan | B60P 1/286 |
| | | | | 298/1 H |

* cited by examiner

| Vessel Floor 64 |
| --- |
| Heating Element 63 |
| Insulation 62 |
| Protective Covering 61 |

HEATED DRILL CUTTINGS TRANSPORT VESSEL

CROSS-REFERENCE TO RELATED APPLICATION

The present application claims the benefit under 35 U.S.C. § 119(e) of U.S. Provisional Application No. 62/120,546 filed Feb. 25, 2015, the disclosure of which is expressly incorporated by reference herein in its entirety.

TECHNICAL FIELD

The field of art to which this invention generally pertains is the transport and processing of drill cuttings.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies and the increasing cost of drilling fluids, the ability to, and benefits of, reclaiming the lost drilling fluids is increasing. However, technologies such as thermal extraction, solvent washes, or alternate mechanical separators cannot accept bulking agents in the extraction process.

Typically, stabilized drill cuttings are loaded into open top, sealed end dumps and then moved to a secure landfill. A sealed end dump is a large open trailer which allows the material to be moved by loader or excavator into the trailer, while the sealed nature of the end dumping gate ensures any transient liquids that are able to leach from the stabilized drill cuttings, remains in the trailer during transport. A tarp or net is moved over the load to ensure that a minimum amount of moving air is in contact with the stabilized drilling waste, preventing it from becoming airborne and leaving the trailer.

This has proven to be a convenient and economical way to transport stabilized drill cuttings. However, the use of this type of transport vessel, which has become an industry standard for transporting drilling waste, is not a practical way to transport unstabilized drilling waste, especially because of potential safety issues. For example, if bad road conditions, driver error, or other adverse circumstances, contribute to an accident, or cause trailer over-turning, the load could easily flow out of the transport vessel onto the ground or otherwise end up in a water-way. The flammable or toxic nature of the oil base or brine base drilling mud contaminating the drill cuttings could cause significant environmental damage or even loss of life.

Thus, the need to transport unstabilized drill cuttings in a safe, efficient manor has arisen.

BRIEF SUMMARY

A transport vessel specifically adapted for transporting unstabilized drill cuttings is described, including a substantially rectangular shaped container body capable of holding unstabilized drill cuttings, the body containing a bottom section, two side sections, a front section, and a removably attached end section, the end section being removably attached to the rectangular body so as to allow emptying of the unstabilized drill cuttings from the container when the front section of the container is raised vertically from a horizontal position, where the bottom section additionally contains one or more heating elements capable of raising the temperature of the drill cuttings at or near the bottom section of the container to a free flowing state.

Additional embodiments include: the vessel described above where the heating elements are electrically heated; the vessel described above where the heating elements contain a heating fluid; the vessel described above where the heating fluid contains water and/or a glycol; the vessel described above where the heating elements are in contact with the outside surface of the bottom section; the vessel described above where the heating elements are in contact with the inside surface of the bottom section; the vessel described above where the heating elements contain a layer of heat insulating material; the vessel described above where the heating elements contain a layer of physical and/or chemical protection; the vessel described above where the protecting layer contains plastic or metal; the vessel described above where the heating elements can heat up to about 2 inches of unstabilized drill cuttings in contact with the bottom section in less than about 120 minutes; the vessel described above where the heating elements can generate up to about 125,000 BTU's of heat energy per hour; the vessel described above having an internal volume of up to about 11 cubic meters; the vessel described above configured to contain about 2 to about 4 cubic meters per axel; the vessel described above including 2 axels; the vessel described above including 3 axels; the vessel described above where the container body is removably attached to the axels through rails which allow the container body to slide or roll off the rails when desired after transport; the vessel described above capable of holding up to about 10,000 to about 20,000 kilograms of liquid containing unstabilized drill cuttings.

A method of transporting unstabilized drill cuttings is also described including filling the vessel described above with unstabilized drill cuttings, transporting the vessel containing the unstabilized drill cuttings to a pre-determined dumping location, and unloading the unstabilized drill cuttings from the vessel, where prior to dumping the unstabilized drill cuttings, the temperature of the drill cuttings at or near the surface of the bottom section, is raised to a free-flowing state; the method described above where the heating elements are electrically heated; the method described above where the heating elements are heated with a heating fluid; the method described above where the heating fluid contains water and/or a glycol; the method described above where the heating elements are in contact with the outside surface of the bottom section; the method described above where the heating elements are in contact with the inside surface of the bottom section; the method described above where the heating elements contain a layer of heat insulating material; the method described above where the heating elements contain a layer of physical and/or chemical protection; the method described above where the heating elements are protected from snow, ice or road debris; the method described above where the protecting layer contains plastic or metal; the method described above where the heating elements heat up to about 2 inches of unstabilized drill cuttings in contact with the bottom section in less than about 120 minutes; the method described above where the heating elements generate up to about 125,000 BTU's of heat energy per hour; the method described above where the cuttings contain about 20% to about 50% liquids by volume; the method described above where the unstabilized drill cuttings are oil based mud drill cuttings or brine based drill cuttings; and the method described above where the weight of the cutting is about 10,000 kilograms to about 20,000 kilograms per transport vessel.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As mentioned above, without stabilization material, the otherwise wet drill cuttings can readily leach free liquids, which is obviously an unacceptable waste behavior both during transport and at any landfill. The cuttings also typically move and behave like a liquid, for example within the transport vessel, due to the high amounts of oil, water or other liquid on the drill cuttings. On a volumetric basis, the cuttings can contain, for example, between about 20% and about 50% liquid.

During the spring, summer and fall months, transportation of the unstabilized drill cuttings present fewer problems, during the loading, transporting and unloading process. However, during the winter, Oil Based drill cuttings behave like molasses and Brine based drill cuttings can freeze solid. This presents a substantial problem as the unloading process can take hours to accomplish, resulting is substantial additions to the transportation costs. Especially without the inclusion of a stabilizing agent, drilling waste also tends to stick to transport vessel surfaces such as the transport vessel floor, walls or baffles if used. While allowing the Brine based drilling waste to freeze prior to loading it into the transport vessel so that it doesn't freeze after loading, and stick to the walls, floor or baffles of the transport vessel, freezing before it is loaded would require equipment at the unloading end capable of breaking the frozen material apart. In addition, weather or limited storage on the job site often dictates when trucks will be called to move the drilling waste off the site to a secure landfill, which often would not cooperate with such an option. See also, for example, U.S. Published Patent Application No. 2014/0353308, the disclosure of which is herein incorporated by reference.

Methods of trying to heat truck bodies to assist in keeping various types of loads from freezing have been attempted in the past, for example, utilizing a duct system within the body to try to capture a flow of exhaust generated by the truck engine so that the flow of exhaust may be passed through the body to heat the contact surfaces. By providing heat to the body in the aforesaid manner, the tendency of the material to adhere to the contact surfaces of the body during freezing weather may indeed be reduced. However, the large diameter piping required to carry the hot exhaust gas is not practical and especially problematic for the truck as it can cause stress upon the engine through such things as back pressure and/or fouling of the heat tubes due to carbon build up, etc.

Other attempts to address this problem have included the use of a plastic liner to line the dump body. However, material may similarly adhere to or otherwise interact with the plastic liner in an adverse manner as well under certain conditions. Using a plastic liner is further problematic as the plastic liner can be released from the transport vessel with the cargo and need to be further separated prior to processing the cargo.

Additional issues around the use of exhaust gas heating systems, even systems using diesel particulate systems, is the transport of the gas to a trailer in tow for example. The use of a flexible hose would be required to join the heating system between the truck and trailer and such is not practical for a number of reasons such as, additional pressure on the exhaust system, flexible hoses connecting the truck to the trailer would be difficult to maintain and install, the flexible hose would need to be insulted in order to ensure the heat value within the flexible hose is maintained between the truck and trailer in a way to provide meaningful heating, etc.

As described herein, there is a need to add heat to the bottom of the transport vessel so that the portion of the unstabilized drill cuttings along the floor of the transport vessel are warmed to a free flowing state, and thus easily slide from the transport vessel during the unloading process. The use of one or more smaller transport vessels which are built like that of a rectangular cube featuring a sealed end gate and sealed lid/roof section, as described in copending, commonly assigned U.S. patent application Ser. No. 15/014,451, filed on Feb. 3, 2016, the disclosure of which is herein incorporated by reference, also contributes to the ability of the heated bottom to work so effectively. The limited size of the transport vessel, in addition to contributing to the efficiency and effectiveness of the heating system, and the placement of the axels, allows for increased stability during transport and only a limited amount of unstabilized drilling waste to be loaded into the transport vessel, which also assists with ensuring that the weight exhibited by the transport vessel and cargo remain within permitted tolerances on roadways and transportation corridors as well. The exact size of the rectangular cube ensures that most of the airspace within the cube is occupied by the cargo thus making the load slightly higher, narrower and shorter than other transport vessels typically used for transport.

This higher, narrower and shorter cargo space helps ensure that any heat introduced through the underside of the floor permeates upward through the unstabilized drilling waste to warm the portion of unstabilized drill cuttings in immediate contact with the floor, and any residual heat can continue upward through the remainder of the mass, ensuring little to no heat is lost in the process. So long as the bottom portion of the cuttings, e.g. about the bottom two inches, is melted, the mass above can be frozen or substantially frozen and the load will still be able to freely flow from the transport vessel. For example, it would/could be like a block of ice that is thawed along the outside of a bowl. The mass will still pour out as long as it isn't "stuck" to the sides/bottom of the bowl or vessel.

A typical transport vessel as described herein would be designed to hold about 11 cubic meters, which is about 390 cubic feet of volume. Tri-axels are typically about 12 feet long so the vessel should desirably extend about one foot past the axels (on each end) which result in a vessel about 15 feet in length. The width of the vessel would be designed to be about 7 feet wide (inside width) and about 3.5 feet in height (inside height). This would result in a total volume of about 390 cubic feet, about 10 cubic meters of volume, including about 8 inches of space from the normal load line to the inside of the lid that seals the transport vessel closed (with every four inches of depth in the vessel equal to about 1 cubic meter of volume).

The vessel described herein is configured to contain approximately 2 to 4 cubic meters per axel, to help accomplish the objectives described herein. A two axel vessel can carry approximately 17,000 kgs and a three axel vessel can carry approximately 23,000 kgs. If the transport vessel and wheels weigh approximately 8,000 kgs to 15,000 kgs, and each cubic meter of drill cuttings weigh approximately 2000 kgs, then the vessel can carry a net weight of approximately 10,000 kgs on a two axel vessel and approximately 20,000 kgs on a tri-axel vessel (e.g., 10,000/2 axels=5,000 kgs=2.5 cubic meters/axel and 20,000/3 axels=6,600 kgs=3.3 cubic meters/axel).

Figure 2:
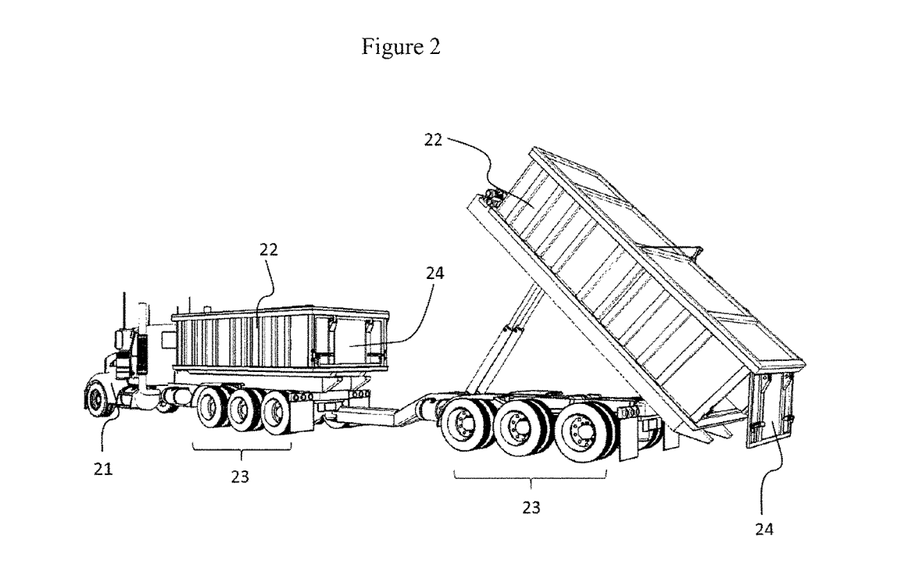
FIG. 2 shows an embodiment of an apparatus as described herein useful in methods as described herein.

As described herein, these problems and others in this area are addressed through the use of one or more smaller transport vessels which are built like that of a rectangular cube, including a sealed end gate and sealed lid/roof section. The size of the transport vessel as stated above, allows a limited amount of unstabilized drilling waste to be loaded into each individual transport vessel, which helps control the weight exhibited by the transport vessel and cargo within, e.g., so as not to exceed the legal axel loading permitted on roadways or other transportation corridors. For example, a single transport vessel could measure 15 feet long (e.g., extending about 1 foot past the axels on each end), 3.5 feet high, and 7 feet wide so that it is nearly the same length as the tri-axels that sit under the vessel. Volumetrically, this vessel could hold up to approximately 11 cubic meters of material which is about 390 cubic feet of volume. A driver would be responsible for loading the vessel until such time that the axels are carrying a legal/recommended/desired amount of weight. This smaller transport vessel would weigh less than traditional larger end dumps and thus, be capable of hauling larger amounts of unstabilized drilling waste cargo on each trip. The design of the trailer transport vessel could be the same as the truck mounted transport vessel, as shown in FIG. 2, for example.

Figure 3:
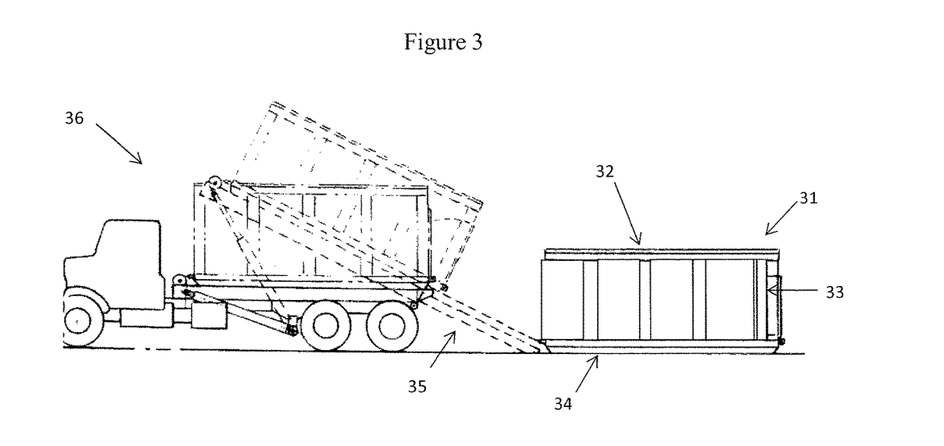
FIG. 3 shows an embodiment of an apparatus as described herein useful in methods as described herein.

Another option is shown in FIG. 3, for potential users of the method and apparatus described herein, who might prefer not to fill the already axel mounted transport vessel (i.e., "front end loader")—for example, for those that may not have an excavator on site, and/or the loader does not have the ability to scoop cuttings to load the transport vessel, or for other reasons. For such users or job-sites another option would be to use a roll-off bin (31) that has a sealable lid (32) and sealable end gate (33), which can be left on site to be loaded as the cuttings are generated. When ready for pick-up, the bin can be top sealed and end sealed, picked up, and an empty bin ready for filling left behind. The bins can be simply exchanged using a conventional skid (34) and rail system (35) transport truck (36).

Figure 4:
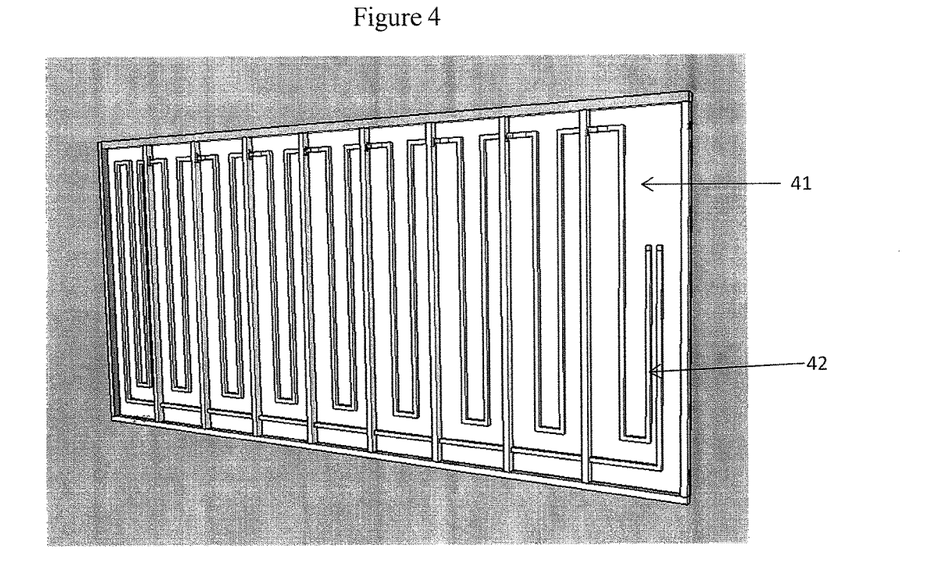
FIGS. 4 and 5 show embodiments of heating systems described herein.

FIG. 4 shows an embodiment of the transport vessel bottom section (41) containing heating elements described herein (42). As described above, the heating elements can be on the external or internal side of the bottom section in relationship to the drill cuttings containing load to be transported.

Figure 5:
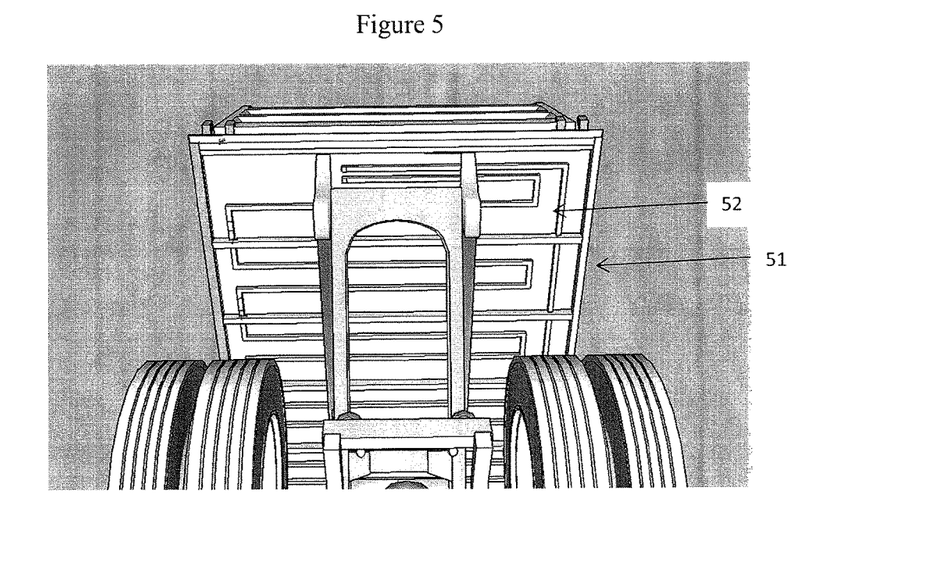

FIG. 5 shows an underside perspective of a transport vessel (51) containing heating elements (52) on the external side of the bottom section of the transport vessel.

On return to the origination point, the transport vessel can be unloaded with a hoe apparatus, or the sealed end gate opened and tipped just like a conventional dump truck. This version of the transport vessel would be constructed to be the same size as the dump truck box (e.g., about 11 cubic meters) and weigh about the same as a regular dump box.

It should be noted that the weight of the wet drill cuttings (bulk density) is typically about 1300 kilograms/cubic meter to about to 2400, more typically about 1600 kilograms/cubic meter to about 2100 kilograms/cubic meter, and most typically about 1850 kilograms/cubic meter.

As described herein, and shown in the Figures, the container is sized so as to substantially equally distribute the weight of the cuttings over each axel, eliminating the need for baffles, or other adjustments, to provide for stable transport of the cuttings. This, coupled with the sealed end gate and cover, provides for spill free, stable transport, even if the trailer were to overturn. More importantly, the smaller nature of each box would allow more weight to be packed on each trip and the cuttings would not be able to move off of one set of axels, putting additional weight on another set of axels.

Figure 1:
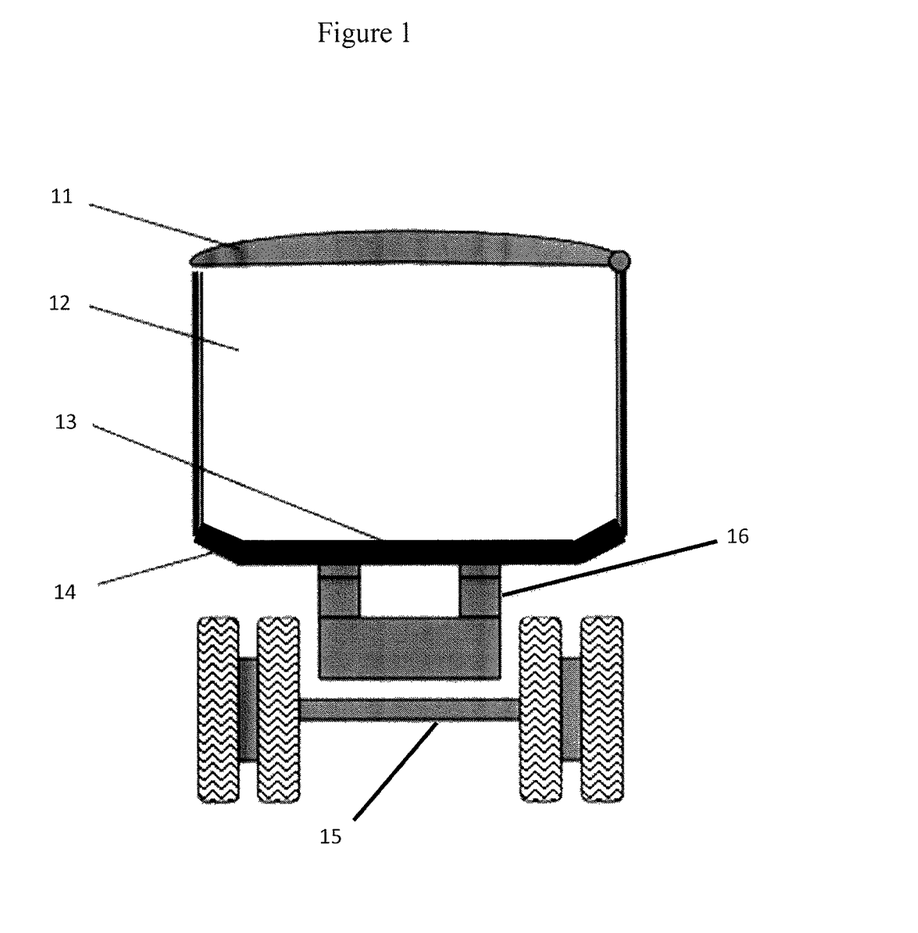
FIG. 1 shows an embodiment of an apparatus as described herein useful in methods as described herein.

As demonstrated in FIG. 1, the sealing clam shell lid (11), covers and encloses the transportation vessel (12). Heated pads (13) or other heat providing materials (pipes, tubes, etc.) as described herein are shown on the underside of the vessel floor, covered with a heat insulating cover (14). Also shown is a supporting axel (15) and supporting frame (16).

As further demonstrated in the FIG. 2, a truck (21), is shown with two transport vessels (22) as described herein, being pulled in series. The containers are sized so as to provide content weight equally distributed over each axel (23). Although the containers are shown in the dump or empty position, the sealed end gate (24) is closed, and therefore, not in the empty position. The lid or cover is shown schematically in the FIG. 1.

The box size is determined by the maximum allowable weight desired to be carried by each axel, divided by the weight of one cube of wet drill cuttings (for example, approximately 2000 kgs). If each box can carry, for example, 20,000 kgs, divided by 2,000 kgs (per cube of unstabilized drill cuttings), the box could be built with the ability of holding approximately 10 cubic meters, plus an allowance of approximately 10% additional capacity which would be the "free board" inside of the vessel, for a total of 11 cubic meters of total capacity.

The use of brine based drill cuttings have become more common because they can offer a faster rate-of-penetration when drilling a well. Brine (or salt) based drilling fluids are almost as expensive as oil based mud systems. While one would think that brine would be considered much friendlier to the environment than oil, it's actually the opposite. The effects of a spill on the environment can be more serious and last much long, especially on vegetation. Brines (e.g., acidic mixtures of chlorides and water) allow good hole stability and high penetration rates. They are very hard on seals, pumps, metal tanks, hoses, etc., however. They can also be a cause of a drilled well to stop producing. That being said, they are still a popular form of drill cutting.

The bottom section of the vessel containing or in contact with the heating elements or heating system described herein, is typically conventional metal material used for transport vessels, and typically about one-quarter inch thick. The selected thickness of the vessel, and the bottom portion in particular, should allow sufficient strength for the vessel walls or floor to contain the cutting being transported, while not being so thick so as to act as an insulator. In short, the thicker the metal the harder it is to transfer heat through it. However, too thin means the walls and floor of the vessel could become damaged during transport of such heavy materials, e.g., causing wash boarding of the metal used in construction. While the end section is typically the same thickness as the walls, the sealing lid can be made of a thinner material, e.g., 0.125" (⅛") or 0.1875 (3/16") so as to use less weight to constitute the lid.

The apparatus and process described herein, address the problems associated with both a product that flows very freely, causing transport stability issues as described, to a product that can behave more like molasses in colder weather, introducing an additional set of problems. During summer months, OBM and Brine based drill cuttings can be moved and tipped very easily because the matrix is very fluidic. During the winter, OBM and Brine based drill cuttings become very sticky and do not easily flow from a transport vessel when it is being emptied, by raising or tipping one side or end for example.

By adding the heating element or heating system to the bottom of the vessel, for example, as strips, small tubes, pipes, etc. the difficulties associated with removal of the drill cuttings from the vessel can be resolved.

While not critical, the heating element could work more efficiently by covering the heating element with a layer of insulation material to help retain the heat, and/or a protective covering, e.g., plastic or metal, to protect the heating layer from ice, snow or other road debris if used outside the vessel, and the oil, salt, or other components of the drill cuttings if used inside the vessel.

In operation, when a truck comes into the unloading facility, the transport vessel can be connected to an electric heating system to power the electric heating strips, or connected to a small boiler so that a hot water/glycol loop could then be pumped through the heating tubes or pipes to transfer heat into the transport vessel, depending on which option is being used. Alternatively, the transport vessels on each the truck and pup could be equipped with a portable heating system (for example, an M-series system from PROHEAT) which would be activated when the truck and trailer combination is being loaded so that the cuttings along the vessel floor would absorb the required heat during the trip back to the unloading facility, e.g., about 30 to about 120 minutes depending on the outdoor temperature, e.g., −40° C., −30° C., −20° C. etc. The hot water/glycol loop from the PROHEAT system would be circulated through the heating pipes so that the vessel is ready to be unloaded the moment it arrives at the unloading facility.

It should be noted that it is not necessary, or even desirable from an efficiency perspective, to heat the entire mass of drill cuttings, but rather, only heat the drill cuttings in direct contact with the floor of the transport vessel so that these cuttings can freely slide out when the vessel is tipped during the unloading process. 250,000 BTU's of heat energy should be sufficient to heat the bottom 2" (along the floor of the vessel) of volume (which could easily be 42" deep). Such a heat input will allow the cuttings to freely slide out of the transport vessel when tipped, even at the lowest normal ambient conditions.

If the electric heating elements are selected to provide the heating, they can be provided in the form of heating strips that would be affixed to the bottom of the transport vessel, for example, and can be attached using conventional epoxy glue (or similar chemical adhesives), or mechanically fastened, using spot welds, for example, or mechanical clamps, or nuts and bolts, etc. One example of heating elements which could be used are 375 High Temperature Strip Heaters provided by Watlow, for example.

Electric heating elements in a variety of shapes and sizes can be used to accomplish the objectives described herein. For example, a 4 to 6 inch wide strip heating element could be placed across the underside of the floor of the vessel, covering about 6 feet of a 7 foot width of the underside of the floor. The strip could consume about 8 kw, so 4 or 5 of these 6 foot strips along the tank bottom could be used successfully to accomplish the objectives described herein. If the vessel is 15 feet long, for example, laying a 6 foot strip about every 3 feet would allow the heat to migrate upwards (and at least slightly sideways) through the vessel floor.

If a tube-type heating system is selected, e.g., such as a PROHEAT system as described above, square tubing (e.g., 1 inch square on a side) with relatively thin walls could be used to dissipate heat relatively quickly through its walls. This light tubing could also be bent to allow it to flex around corners and once the desired shape is determined, small sections of it could be attached, by welding, for example, to the underside of the vessel floor to hold it in place. In the case of the use of such tubing, the more tubing used the better, since the watt-density per square inch will be extremely low. It is estimated that about 140 feet of this tubing in contact with the underside of the floor could provide a suitable option.

Figure 6:
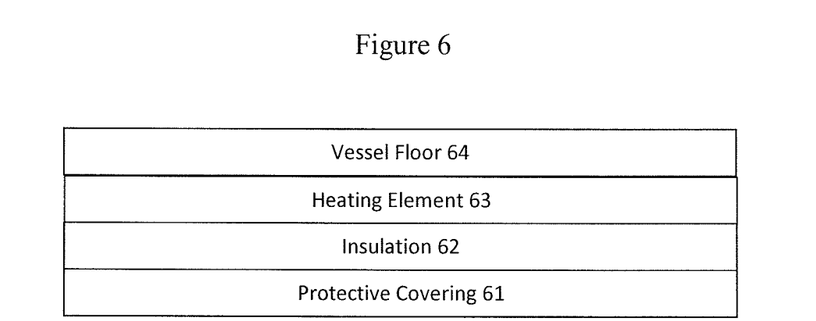
FIG. 6 shows schematically an embodiment of a heating system described herein.

A layer of insulation provided under the heated tubing to reflect lost heat back up at the vessel floor, would provide a desirably option for such a water/glycol heating system, for example. As shown, for example, schematically in FIG. 6, a light protective layer (61) like plastic or sheet metal screwed or otherwise attached to the frame of the vessel could protect the insulation (62) and heating elements (63) attached to the vessel floor (64) with an added layer of protection from snow, ice, water, rocks, dirt, etc.

The methods and apparatus described herein meet the challenges described above, including, among other things, achieving more efficient and effective drill cutting transport and processing, including prevention, spillage or loss of drill cuttings when the vessel is in a position other than horizontal, e.g., accident, overturn or other upsetting of the transport vessel during transport. Of course during filling and emptying of the vessel, the removably attached lid and end sealing sections would be operated so as to allow filling and emptying.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transport vessel specifically adapted for transporting unstabilized drill cuttings comprising,
   a substantially rectangular shaped container body capable of holding unstabilized drill cuttings, the body comprising a bottom section, two side sections, a front section, and a removably attached end section,
   the end section being removably attached to the rectangular body so as to allow emptying of the unstabilized drill cuttings from the container when the front section of the container is raised vertically from a horizontal position,
   wherein the bottom section additionally contains one or more heating elements capable of raising the temperature of the drill cuttings at or near the bottom section of the container to a free flowing state and wherein the heating elements are electrically heated or contain a heating fluid.

2. The vessel of claim 1 wherein the heating fluid contains water and/or a glycol.

3. The vessel of claim 1 wherein the heating elements are in contact with the outside surface of the bottom section.

4. The vessel of claim 1 wherein the heating elements are in contact with the inside surface of the bottom section.

5. The vessel of claim 1 wherein the heating elements contain a layer of heat insulating material.

6. The vessel of claim 1 wherein the heating elements contain a layer of physical and/or chemical protection.

7. The vessel of claim 1 wherein the protecting layer contains plastic or metal.

8. The vessel of claim 1 wherein the heating elements can heat up to about 2 inches of unstabilized drill cuttings in contact with the bottom section in less than about 120 minutes.

9. The vessel of claim 1 wherein the heating elements can generate up to about 125,000 BTU's of heat energy per hour.

10. The vessel of claim 1 having an internal volume of up to about 11 cubic meters.

11. The vessel of claim 1 configured to contain about 2 to about 4 cubic meters per axel.

12. The vessel of claim 11 including 2 axels.

13. The vessel of claim 11 including 3 axels.

14. The vessel of claim 1 wherein the container body is removably attached to the axels through rails which allow the container body to slide or roll off the rails when desired after transport.

15. The vessel of claim 1 capable of holding up to about 10,000 to about 20,000 kilograms of liquid containing unstabilized drill cuttings.

16. A method of transporting unstabilized drill cuttings comprising filling the vessel of claim 1 with unstabilized drill cuttings, transporting the vessel containing the unstabilized drill cuttings to a pre-determined dumping location, and unloading the unstabilized drill cuttings from the vessel by raising the front section of the container vertically from a horizontal position, wherein, prior to dumping the unstabilized drill cuttings, the temperature of the drill cuttings at or near the surface of the bottom section, is raised to a free-flowing state.

17. The method of claim 16 wherein the heating fluid contains water and/or a glycol.

18. The method of claim 16 wherein the heating elements are in contact with the outside surface of the bottom section.

19. The method of claim 16 wherein the heating elements are in contact with the inside surface of the bottom section.

20. The method of claim 16 wherein the heating elements contain a layer of heat insulating material.

21. The method of claim 16 wherein the heating elements contain a layer of physical and/or chemical protection.

22. The method of claim 21 wherein the heating elements are protected from snow, ice or road debris.

23. The method of claim 21 wherein the protecting layer contains plastic or metal.

24. The method of claim 16 wherein the heating elements heat up to about 2 inches of unstabilized drill cuttings in contact with the bottom section in less than about 120 minutes.

25. The method of claim 16 wherein the heating elements generate up to about 125,000 BTU's of heat energy per hour.

26. The method of claim 16 wherein the cuttings contain about 20% to about 50% liquids by volume.

27. The method of claim 16 wherein the unstabilized drill cuttings are oil based mud drill cuttings or brine based drill cuttings.

28. The method of claim 16 wherein the weight of the cuttings is about 10,000 kilograms to about 20,000 kilograms per transport vessel.

* * * * *